Patented July 10, 1951

2,559,672

UNITED STATES PATENT OFFICE 2,559,672

AZO COMPOUNDS OF THE THIOPHANTHRAQUINONE SERIES

Herman E. Schroeder and Lorraine A. Ringrose, Wilmington, Del., assignors to E. I. du Pont de Nemours & Company, Wilmington, Del., a corporation of Delaware No Drawing. Application June 17, 1949, Serial No. 99,876

5 Claims. (Cl. 260—152)

This invention relates to the preparation of new dyes and dye intermediates of the thiophanthraquinone series, and more particularly to new azo-biphenyl-carbonylaminothiophanthraquinones of the general formula:

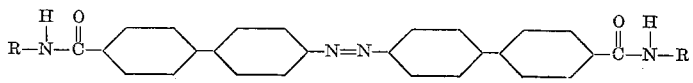

in which one R stands for a thiophanthraquinone radical and the second R for an anthraquinone radical or a second thiophanthraquinone radical, and in which the thiophanthraquinone radical or radicals and the anthraquinone radical may be unsubstituted or may contain simple monovalent substituents such as halogen, methoxy, benzoylamino and thenoylamino groups. In all cases the thiophanthraquinone radical is attached to the aminonitrogen atom through its benzene nucleus.

While a number of vat dyes in the yellow range have been used in the dyeing and printing of textiles, the fastness properties of these yellow colors are poor as compared with the fastness properties of many of the other colors in the vat dye class. Where yellow dyes in this class with improved fastness properties have been found, they in turn are either dull or weak tinctorially and therefore the various yellow dyes in the vat dye class are chosen to answer a particular need, balancing the question of fastness, brightness and cost of the particular dye available. In U. S. Patent 2,175,803, a group of imidazole and oxazole dyes containing an azo linkage are disclosed which dye vegetable fibers in yellowish shades and which are said to exhibit good fastness to chlorine and boiling soap solution, and, in certain cases, to light. It has been found, however, that these dyes are deficient in wet fastness particularly in kier boiling, and in their vat stability. In U. S. Patent 2,228,455 a series of dianthraquinonylimides containing azo groups are disclosed which have relatively good fastness properties but which have been found to dye in dull and considerably weaker shades than the azole types of the first mentioned patent.

It is an object of the present invention to produce new and valuable dyes and dye intermediates of the thiophanthraquinone series which dye cotton and related fibers from the usual alkaline hydrosulfite vats in desirable yellow shades and which exhibit improved brightness, tinctorial strength and fastness properties as compared to dyes of similar shade now available. It is a more specific object of the invention to produce thiophanthraquinone vat dyes which are 4'',4'''-substituted azobiphenyl compounds carrying at least one thiophanthraquinoneiminocarbonyl group.

The compounds of the present invention are prepared by condensing one mol of an aminothiophanthraquinone compound with one mol of 4,4'-azobiphenyl-4'',4'''-dicarbonylchloride to produce the azobiphenyl-4''-carbonylaminothiophanthraquinone-4'''-carbonylchloride as more particularly disclosed in our co-pending application Serial No. 99,874 filed of even date herewith. These azobiphenyl-4''-carbonylaminothiophanthraquinone-4'''-carbonyl chlorides are further condensed with an aminothiophanthraquinone or an aminoanthraquinone. Where the same aminothiophanthraquinone is to be condensed on both carbonylchloride groups of the azobiphenyl compound, 2 mols of the aminothiophanthraquinone may be condensed directly with the azobiphenyldicarbonylchloride. The condensations are preferably carried out in an inert organic solvent under anhydrous conditions at temperatures of from 140° to 200° C. The resulting dyes may be purified by recrystallization from concentrated sulfuric acid or by the usual bleaching with alkaline hypochlorites in the manner customarily employed in purifying vat dyes of the anthraquinone vat dye series.

In the following examples, the azobiphenyldicarboxylic acid employed may be readily prepared by an alkaline dextrose reduction of 4,4'-nitrophenylbenzoic acid. The conversion of the dicarboxylic acid to the dicarboxylic acid chloride having a melting point of 262° C. may be effected by reacting the sodium salt of the azobiphenyldicarboxylic acid with thionyl chloride or phosphorous pentachloride in an inert solvent such as nitrobenzene and in the presence of a catalyst such as pyridine.

The following examples are given to illustrate the invention. The parts used are by weight.

Example 1

To a mixture of 7.5 parts of 4,4'-azobiphenyl-4''-(5-carbonylaminothiophanthraquinone)-4'''-carbonyl chloride and 80 parts of dry nitrobenzene at 130° C. were added 2.7 parts of 1-aminoanthraquinone. The charge was heated at 160° C. for four hours, filtered at 100° C., and the bright yellow crystalline product was washed with nitrobenzene, alcohol and water, in turn. The 4,4' - azobiphenyl - 4'' - (5 - carbonylaminothiophanthraquinone - 4''' - (1 - carbonylaminoanthraquinone) was purified by bleaching with alkaline hypochlorite in the usual method. The product which is represented by the formula:

biphenyldicarbonyl chloride with 3.4 parts of 5-aminothiophanthraquinone) was added 5 parts of 1-amino-5-benzoylaminoanthraquinone. The charge was heated at 160° C. for four and one-half hours, filtered at 90° C., and the product was washed with nitrobenzene, alcohol and

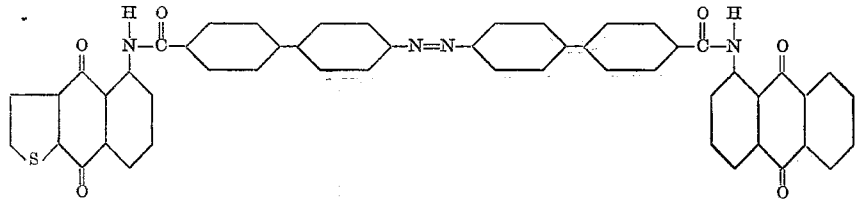

gives an orange color in concentrated sulfuric acid and dyes vegetable fibers in bright yellow shades from an orange alkaline hydrosulfite vat.

water. The bright yellow 4,4'-azobiphenyl-4''-(5 - carbonylaminothiophanthraquinone) - 4''' - (1 - carbonylamino - 5 - benzoylaminoanthraquinone), which was purified by alkaline bleaching in the usual method, is represented by the formula:

Example 2

At 130° C., 2.5 parts of 1-amino-6-chloroan-

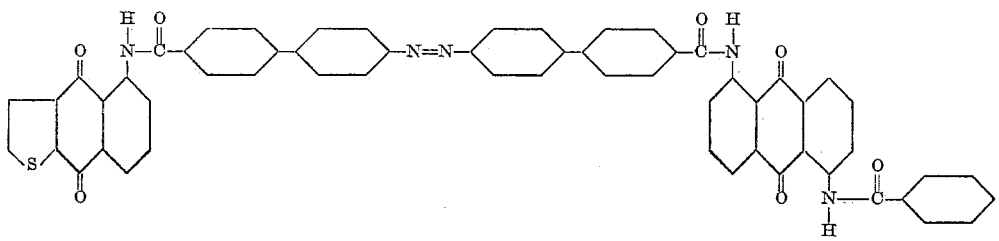

thraquinone were added to a mixture of 6 parts of 4,4'-azobiphenyl-4''-(5-carbonylaminothiophanthraquinone) - 4''' - carbonyl chloride and 70 parts of nitrobenzene. The charge was treated in the same manner as that in Example 1. The greenish-yellow needle-like 4,4'-azobiphenyl - 4'' - (5 - carbonylaminothiophanthraquinone) - 4''' - (1 - carbonylamino - 6 - chloroanthraquinone), which is represented by the formula:

It gives an orange color in concentrated sulfuric acid and dyes vegetable fibers in bright yellow shades of excellent light fastness from an orange alkaline hydrosulfite vat.

Example 4

A mixture of 100 parts of dry nitrobenzene, 6.5 parts of azobiphenyldicarbonyl chloride and 6.9 parts of 5 - aminothiophanthraquinone was

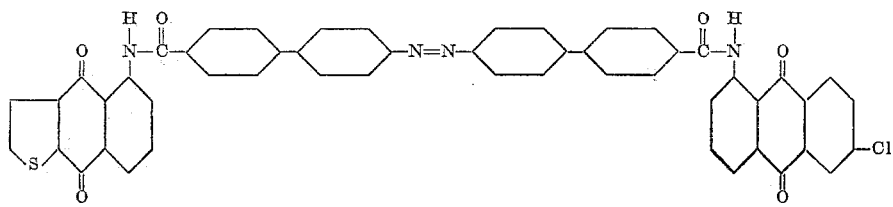

gives an orange color in concentrated sulfuric acid and dyes vegetable fibers in bright yellow shades of excellent fastness properties from orange alkaline hydrosulfite vat.

Example 3

To a mixture of 100 parts of dry nitrobenzene and 4,4' - azobiphenyl - 4'' - (5 - carbonylaminothiophanthraquinone) - 4''' - carbonyl chloride (prepared by condensation of 6.5 parts of azo-heated at 150° C. for two hours, then at 160° C. for four hours. The charge was filtered at 100° C. and the bright yellow crystalline product was treated as in Example 1. The 4,4'-azobiphenyl-4'',4''' - di - (5-carbonylaminothiophanthraquinone), which has the formula:

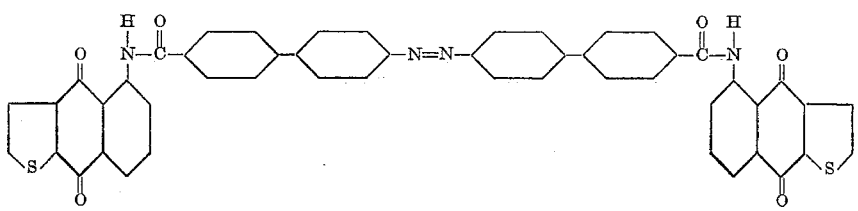

gives an orange color in concentrated sulfuric acid and dyes vegetable fibers in bright yellow shades from an orange alkaline hydrosulfite vat.

Example 5

To a mixture of 75 parts of dry nitrobenzene and 5 parts of azobiphenyldicarbonyl chloride at 130° C., was added 5 parts of 6-aminothiophanthraquinone. The charge was heated at 150° C. for one hour, at 160° C. for four hours, then filtered at 100° C., and the greenish-yellow needle-like product was washed with nitrobenzene, alcohol, water, and was dried. The 4,4'-azobiphenyl -4'',4'''-di-(6- carbonylaminophanthraquinone), which was acid pasted and bleached by usual methods, is represented by the formula:

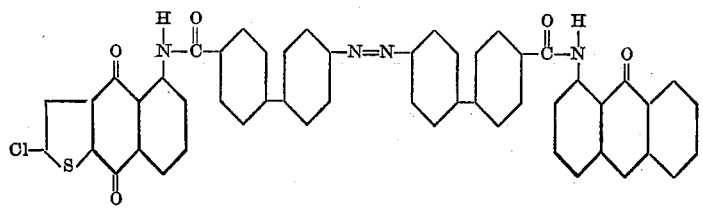

It gives an orange color in concentrated sulfuric acid and dyes vegetable fibers in bright green-yellow shades from an orange alkaline hydrosulfite vat. This color is readily vattable and tinctorially strong. It has good fastness to light and to wet treatments. The corresponding molecule from two mols of 2-amino-anthraquinone is almost unvattable and tinctorially about one-seventh as strong.

Example 6

A mixture of 75 parts of dry nitrobenzene, 4,4' - azobiphenyl - 4'' - (5 - carbonylamino-2-chlorothiophanthraquinone) -4'''-carbonyl chloride [prepared in situ from 5 parts of azobiphenyldicarboxylic acid and 3.3 parts of 2-chloro - 5 - aminothiophanthraquinone (disclosed in applications Serial Numbers 786,335 and 786,337 now U. S. Patents 2,480,109 and 2,480,111, respectively)], and 2.8 parts of 1-aminoanthraquinone was heated at 160° C. for four and one-half hours. The charge was filtered at 100° C., and the bright yellow product was washed with nitrobenzene, alcohol and water. The 4,4'-azobiphenyl -4'' - (5 - carbonyl-amino - 2 - chlorothiophanthraquinone) -4''' - (1- carbonylamino-anthraquinone), which was purified through bleaching by the usual methods, is represented by the formula:

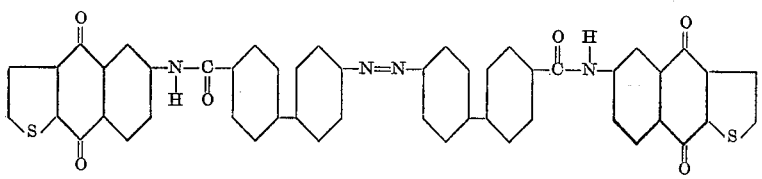

It gives an orange solution in concentrated sulfuric acid and dyes vegetable fibers in bright yellow shades from an orange alkaline hydrosulfite vat.

Example 7

To a slurry of 4,4'-azobiphenyl-4''-(5-carbonylamino - 8 - benzoylaminothiophanthraquinone)-4'''-carbonyl chloride in nitrobenzene (prepared by condensation of 6 parts of azobiphenyldicarbonyl chloride with 4.8 parts of 5-benzoylamino - 8 - aminothiophanthraquinone in 90 parts of nitrobenzene) were added 4.7 parts of 1-amino-4-benzoylaminoanthraquinone. The charge was heated at 160° C. for one hour, then at 190° C. for four hours, filtered at 100° C., and the product was washed with nitrobenzene, alcohol, water and dried. The orange-colored crystalline 4,4' - azobiphenyl - 4'' - (5- carbonylamino - 8 - benzoylaminothiophanthraquinone)-4''' - (1 - carbonylamino - 4 - benzoylaminoanthraquinone), which was acid pasted and bleached by usual methods, is represented by the formula:

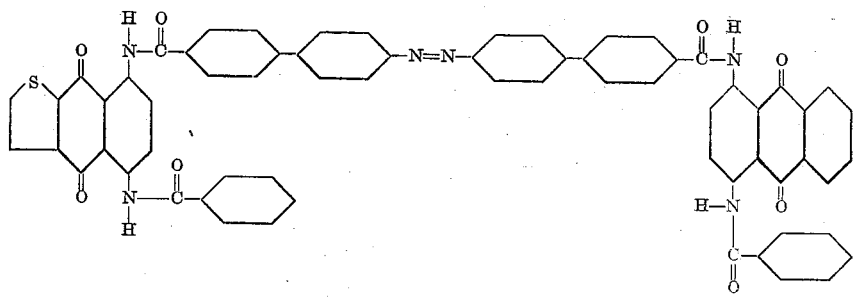

It gives a red-orange solution in sulfuric acid and dyes vegetable fibers in yellow-orange shades from a brown-red alkaine hydrosulfite vat.

Example 8

At 130° C., 9.4 parts of 1-chloro-2-aminoanthraquinone were added to a mixture of 4,4'-azobiphenyl -4''- (5-carbonylaminothiophanthraquinone) -4'''-carbonyl chloride (prepared from 16 parts of azobiphenyldicarbonyl chloride and 8.4 parts of 5-aminothiophanthraquinone) and the charge was treated as that in Example 1. The greenish yellow crystalline 4,4'-azobiphenyl- 4'' - (5 - carbonyl - amionothiophanthraquinone) - 4''' - (2 - carbonylamino - 1 - chloroanthraquinone), which was purified through bleaching, is represented by the formula:

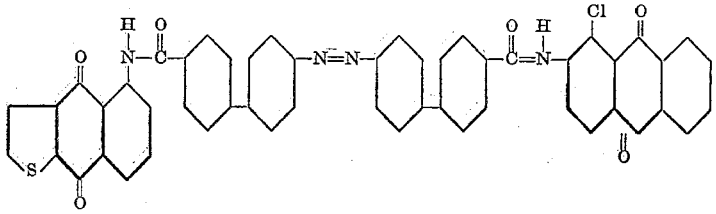

It gives an orange solution in concentrated sulfuric acid and dyes vegetable fibers in yellow shade of good tinctorial strength from an orange alkaline hydrosulfite vat.

Other products of this series, which were prepared by condensation of azobiphenylcarbonylaminothiophanthraquinonecarbonyl chlorides with aminothiophanthraquinones or aminoanthraquinones by essentially the same method as that described in Example 8, are described in the following table. In this table the aminothiophanthraquinone employed in the preparation of the azobiphenylcarbonylaminothiophanthraquinonecarbonyl chloride is illustrated in column R, while the amino compound which is to be condensed therewith is listed under R'.

tion Serial No. 99,871] was heated one hour at 130° C., three hours at 185°–190° C. and then one hour at 205°–210° C., at which time evolution of hydrogen chloride was complete. The greenish-yellow crystalline compound, which is obtained in excellent yield, has the structure:

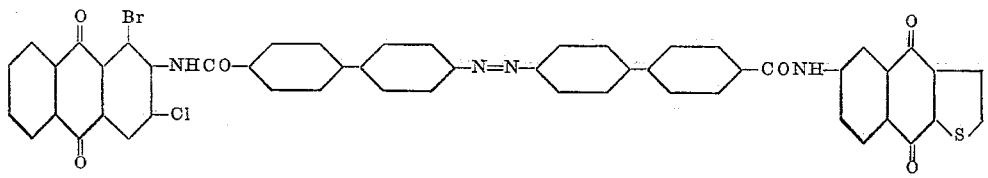

and dyes cotton greenish-yellow shades from an orange alkaline hydrosulfite vat.

Other combinations of the azobiphenyl-carbonylaminothiophanthraquinone-carbonyl chlorides with aminothiophanthraquinones or aminoanthraquinones may be effected in the same manner as illustrated in the above examples to give dyes having similar dyeing characteristics, such as, for example, 4,4'-azobiphenyl-4'' - (5 - carbonylaminothiophanthraquinone)-4'''-carbonyl chloride with 5-chloro-6-aminothiophanthraquinone, 4,4' - azobiphenyl-4''-(6-carbonylamino-5-chlo-

| Ex. | R | R' | Properties of Product | | |
|---|---|---|---|---|---|
| | | | Appearance | Color in Con. H₂SO₄ | Color of Vat |
| 9 | 5-Aminothiophanthraquinone | 1,3-dibromo-2-aminoanthraquinone | Green-yellow crystals | orange | orange. |
| 10 | 6-Aminothiophanthraquinone | 1-chloro-2-aminoanthraquinone | Very green-yellow crystals | do | Do. |
| 11 | do | 2-amino-3-bromoanthraquinone | Very green-yellow needles | do | Do. |
| 12 | 6-Amino-5-chlorothiophanthraquinone | 1-chloro-2-aminoanthraquinone | do | do | Do. |
| 13 | do | 1-amino-5-benzoylaminoanthraquinone | Green-yellow crystals | do | Do. |
| 14 | do | 5-chloro-6-aminothiophanthraquinone | Green-yellow needles. | do | Do. |
| 15 | 6-Amino-7-bromothiophanthraquinone | 2-amino-3-bromoanthraquinone | Very green-yellow needles | do | Do. |
| 16 | 6-Amino-5,7-dibromothiophanthraquinone | 1,3-dibromo-2-aminoanthraquinone | Very green-yellow crystals | do | Do. |
| 17 | 8-Aminothiophanthraquinone | 1-chloro-2-aminoanthraquinone | Yellow crystals | do | Do. |
| 18 | 5-Aminothiophanthraquinone | 1-amino-4-benzoylaminoanthraquinone | Orange plates | red-orange | brown-red vat. |
| 19 | 7-aminothiophanthraquinone | 1-chloro-2-aminoanthraquinone | Very green-yellow crystals | orange | orange. |

It will be obvious that, in place of the 4,4'-azobiphenyl - 4'' - (5 - carbonylaminothiophanthraquinone)-4'''-carbonyl chloride used in the above examples, the unsymmetrical substituted azobiphenyldicarbonyl chloride compound may be obtained by starting with the 4,4'-azobiphenyl-4'' - (carbonylaminochloroanthraquinone) - 4'''-carbonyl chloride, which is in turn condensed with an aminothiophanthraquinone compound in the manner illustrated in the following example.

*Example 20*

A mixture of 1.5 parts of 6-aminothiophanthraquinone, 80 parts of dry nitrobenzene and 4.7 parts of 4,4'-azobiphenyl-4''-(1-bromo-2-carbonylamino - 3 - chloroanthraquinone)-4'''-carbonyl chloride [prepared as described in applicarothiophanthraquinone)-4'''-carbonyl chloride with 2-aminoanthraquinone, 4,4' - azobiphenyl - 4'' - (5 - carbonylamino - 8-methoxythiophanthraquinone) - 4''' - carbonyl chloride with 5-chloro-6-aminothiophanthraquinone, and 4,4'-azobiphenyl-4''-(5-carbonylamino-6-bromothiophanthraquinone)-4''' - carbonyl chloride with 1-chloro-2-aminoanthraquinone.

In place of the substantially pure aminothiophanthraquinones, it will be obvious that mixtures may be used, more particularly the normally occurring mixtures of aminothiophanthraquinones or halogen-aminothiophanthraquinones such as a mixture of the 5,8-aminothiophanthraquinones, the 6- and 7-aminothiophanthraquinones, the 5-chloro-6-amino- or the 8-chloro-7-aminothiophanthraquinones.

Symmetrical diamides may be prepared by condensation of two mols of an aminothiophanthraquinone with one mol of azobiphenyldicarbonyl chloride. Condensation may be carried out under a wide variety of conditions as to temperature and time, depending upon the reactants to be used. A temperature range of 140°–200° C. usually affords most satisfactory results although temperatures outside of this range are occasionally necessary. The condensations are carried out in inert organic solvents such as the aromatic hydrocarbons and chlorinated and nitrated aromatic hydrocarbons, and catalysts such as pyridine may be used if desired.

The compounds of this invention are new and

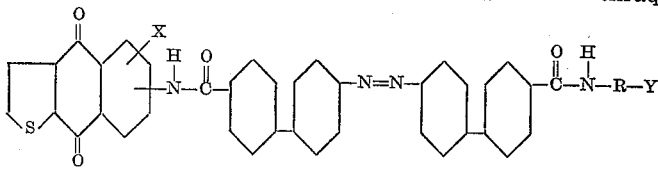

useful vat dyestuffs, dyeing generally in the yellow shade range, having very good light fastness. They are particularly valuable in that they are good printing colors as well as dyeing colors, building up to stronger shades than can be obtained with the corresponding anthraquinone colors. Of the new compounds, of particular utility are those with a halogen ortho to the amino groups which on further reaction can be ring-closed to an oxazole or a thiazole compound. The dyes thus formed have better tinctorial strength and fastness properties than the corresponding anthraquinone compound.

The various intermediates employed in the preparation of the compounds of this invention may be produced by the processes more particularly described in our co-pending application Serial No. 99,874, filed of even date herewith.

in which at least one R stands for a thiophanthraquinone radical and the second R for a radical of the group consisting of thiophanthraquinone radicals and anthraquinone radicals, the thiophanthraquinone and the anthraquinone radicals in each case being of the group consisting of the unsubstituted thiophanthraquinone and anthraquinone radicals and the thiophanthraquinone and anthraquinone radicals which carry monovalent substituents of the group consisting of chlorine, bromine, methoxy, benzoylamino and thenoylamino groups, which substituents in the case of the thiophanthraquinone radical are attached to the benzene nucleus and the thiophanthraquinone radical is attached to the amino-nitrogen atom of the carbonylamino group in the formula through its benzene nucleus.

2. The azobiphenylcarbonylaminothiophanthraquinones of the formula:

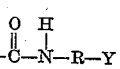

in which the thiophanthraquinone radical shown is attached to the amino-nitrogen atom through its benzene nucleus, R stands for a radical of the group consisting of anthraquinone and thiophanthraquinone radicals the thiophanthraquinone radical being attached to the amino-nitrogen atom through its benzene nucleus, and X and Y which are ortho to the amino-nitrogen atoms stands for members of the group consisting of hydrogen, chlorine and bromine atoms and at least one thereof stands for one of the halogen atoms.

3. The azobiphenylcarbonylaminothiophanthraquinone of the formula:

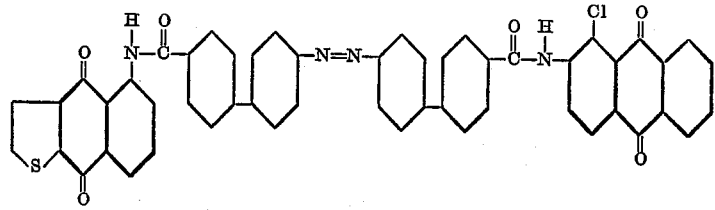

4. The azobiphenylcarbonylaminothiophanthraquinone of the formula:

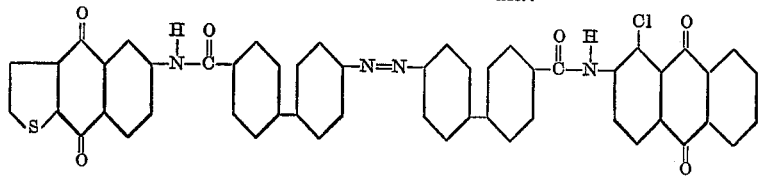

5. The azobiphenylcarbonylaminothiophanthraquinone of the formula:

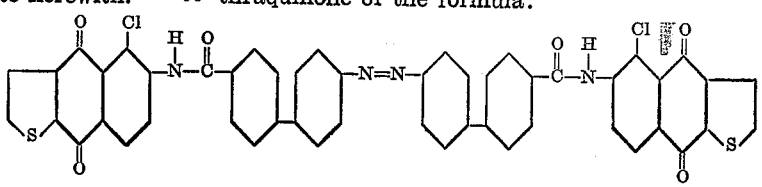

HERMAN E. SCHROEDER.
LORRAINE A. RINGROSE.

No references cited.

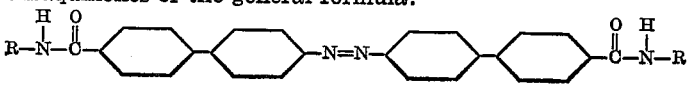

We claim:
1. The azobiphenylcarbonylaminothiophanthraquinones of the general formula: